US010000425B2

(12) United States Patent
Le Costaouec et al.

(10) Patent No.: US 10,000,425 B2
(45) Date of Patent: Jun. 19, 2018

(54) SYSTEMS AND METHODS FOR CARBON STRUCTURES INCORPORATING SILICON CARBIDE WHISKERS

(71) Applicant: Goodrich Corporation, Charlotte, NC (US)

(72) Inventors: Jean-Francois Le Costaouec, Pueblo West, CO (US); Paul Perea, Pueblo West, CO (US)

(73) Assignee: GOODRICH CORPORATION, Charlotte, NC (US)

(*) Notice: Subject to any disclaimer, the term of this patent is extended or adjusted under 35 U.S.C. 154(b) by 0 days. days.

(21) Appl. No.: 15/075,538

(22) Filed: Mar. 21, 2016

(65) Prior Publication Data
US 2017/0267594 A1 Sep. 21, 2017

(51) Int. Cl.
C04B 41/45 (2006.01)
F16D 69/02 (2006.01)
C04B 41/00 (2006.01)
C04B 41/87 (2006.01)
C04B 41/50 (2006.01)
C04B 41/48 (2006.01)

(52) U.S. Cl.
CPC .......... *C04B 41/457* (2013.01); *C04B 41/009* (2013.01); *C04B 41/4596* (2013.01); *C04B 41/48* (2013.01); *C04B 41/488* (2013.01); *C04B 41/4873* (2013.01); *C04B 41/5035* (2013.01); *C04B 41/5041* (2013.01); *C04B 41/5042* (2013.01); *C04B 41/87* (2013.01); *F16D 69/023* (2013.01); *C04B 2235/3826* (2013.01); *C04B 2235/422* (2013.01)

(58) Field of Classification Search
CPC .... C23C 16/045; C23C 16/52; C23C 16/4581
See application file for complete search history.

(56) References Cited

U.S. PATENT DOCUMENTS

| 5,340,417 | A | 8/1994 | Weimer et al. |
| 5,962,135 | A | 10/1999 | Walker |
| 6,548,586 | B1 * | 4/2003 | Phani ............ C08L 61/06 423/324 |
| 7,378,362 | B2 | 5/2008 | Nixon et al. |
| 8,058,197 | B2 | 11/2011 | Ichikawa et al. |
| 8,940,391 | B2 | 1/2015 | Garnier et al. |
| 9,045,374 | B2 | 6/2015 | Keller et al. |
| 2005/0271876 | A1 | 12/2005 | Walker et al. |
| 2008/0090064 | A1 | 4/2008 | James et al. |

(Continued)

FOREIGN PATENT DOCUMENTS

| CN | 103553616 | 2/2014 | |
| EP | 1748036 A1 * | 1/2007 | ........... C04B 35/565 |

(Continued)

OTHER PUBLICATIONS

EP Search Report dated Oct. 26, 2017 in EP Application No. 17159546.5.

*Primary Examiner* — Joel G Horning
(74) *Attorney, Agent, or Firm* — Snell & Wilmer, L.L.P.

(57) ABSTRACT

A method of treating a carbon structure is provided. The method may include infiltrating the carbon structure with a silicon compound preparation, heat treating the carbon structure to form a plurality of silicon carbide whiskers in the carbon structure, and/or densifying the carbon structure.

19 Claims, 5 Drawing Sheets

(56) References Cited

U.S. PATENT DOCUMENTS

| | | |
|---|---|---|
| 2009/0078514 A1 | 3/2009 | Baud |
| 2010/0069223 A1 | 3/2010 | Prilutsky et al. |
| 2010/0291373 A1* | 11/2010 | Baud .................. C04B 35/83 428/325 |
| 2011/0250428 A1 | 10/2011 | Leventis et al. |
| 2013/0337180 A1* | 12/2013 | Jacquemard ............ C04B 35/83 427/372.2 |
| 2015/0166410 A1 | 6/2015 | Waghray et al. |

FOREIGN PATENT DOCUMENTS

| | | | |
|---|---|---|---|
| EP | 2886525 | 6/2015 | |
| WO | WO 2006067184 A1 * | 6/2006 | ........... C04B 35/624 |

* cited by examiner

SYSTEMS AND METHODS FOR CARBON STRUCTURES INCORPORATING SILICON CARBIDE WHISKERS

FIELD

The present disclosure relates to carbon composites, and, more specifically, to a method of forming carbon composites.

BACKGROUND

Aircraft brakes may comprise carbon brake components. The brake system rotor friction disks, stator friction disks, pressure plates, and end plates, for example, may be comprised of carbon fiber and pyrolytic composite materials, forming a carbon structure. Brake system rotor friction disks and stator friction disks comprising carbon fiber composite materials may exhibit varying wear characteristics resulting in part from the materials used in construction and heat treatments applied. Brake components with poor wear characteristics may have relatively short product lives and be associated with more frequent maintenance or replacement.

SUMMARY

In various embodiments, a method for treating a carbon structure may comprise infiltrating the carbon structure with a silicon compound preparation, heat treating the carbon structure to form a plurality of silicon carbide whiskers in the carbon structure, and/or densifying the carbon structure. The densifying the carbon structure may be completed by chemical vapor infiltration. In various embodiments, the method may comprise partially densifying the carbon structure before the infiltration of the carbon structure with the silicon compound preparation. In various embodiments, the method may comprise partially densifying the carbon structure after infiltrating the carbon structure with the silicon compound preparation, forming a partially densified carbon structure. The method may further comprise infiltrating the partially densified carbon structure with the silicon compound preparation. In various embodiments, the method may comprise applying a thin pyrolytic carbon layer to the carbon structure before infiltrating the carbon structure with a silicon compound preparation. In various embodiments, the method may comprise applying a stoichiometric adjustment preparation comprising at least one of silicon dioxide, zirconium oxide, or titanium oxide to the carbon structure.

In various embodiments, the silicon compound preparation may comprise at least one of silicon nitride, silicon monoxide, or silicon dioxide as a silicon source. In various embodiments, the silicon compound preparation may comprise a carbon source, which may comprise carbon black, sucrose, dextrose, maltose, cellulose, polyvinyl butyral, polyethylene glycol, poly polyvinyl alcohol, polyacrylamide, polyvinylpyrrolidone, polyvinyl acetate, polyethyleneimine, polyvinyl butyral, polyacrylate, and/or a polyester, epoxy, and/or phenolic resin. The silicon compound preparation may comprise at least one of a colloidal suspension or a sol gel. The silicon compound preparation may comprise at least one of a nickel compound, an iron compound, a cobalt compound, and/or a titanium compound. In various embodiments, heat treating the carbon structure may comprise a temperature ranging from 1400° C. to 1850° C. In various embodiments, after densifying the carbon structure, the plurality of silicon carbide whiskers may comprise 5% to 35% by weight of the carbon structure.

In various embodiments, a method for treating a carbon structure may comprise forming the carbon structure, treating the carbon structure with heat at a first temperature ranging from 1000° C. to 2400° C., infiltrating the carbon structure with a silicon compound preparation comprising at least one of a silicon colloidal suspension or a sol gel, the silicon compound preparation comprising at least one of silicon nitride, silicon monoxide, or silicon dioxide as a silicon source, treating the carbon structure with heat at a second temperature ranging from 1400° C. to 1850° C. to form a plurality of silicon carbide whiskers, and/or densifying the carbon structure.

In various embodiments, the method may comprise partially densifying the carbon structure before the infiltration of the carbon structure with the silicon compound preparation. In various embodiments, the method may comprise partially densifying the carbon structure after infiltrating the carbon structure with the silicon compound preparation, forming a partially densified carbon structure. The method may further comprise infiltrating the partially densified carbon structure with the silicon compound preparation. In various embodiments, after densifying the carbon structure, the plurality of silicon carbide whiskers may comprise 5% to 35% by weight of the carbon structure.

In various embodiments, a method for treating a carbon structure may comprise forming a carbon structure, treating the carbon structure with heat a first temperature ranging from 1000° C. to 2400° C., applying a stoichiometric adjustment preparation to the carbon structure, infiltrating the carbon structure with a silicon compound preparation comprising at least one of a silicon colloidal suspension or a sol gel, the silicon compound preparation comprising at least one of silicon nitride, silicon monoxide, or silicon dioxide as a source of silicon, treating the carbon structure with heat at a second temperature ranging from 1400° C. to 1850° C. to form a plurality of silicon carbide whiskers within a plurality of pores in the carbon structure, and/or densifying the carbon structure by chemical vapor infiltration.

In various embodiments, the stoichiometric adjustment preparation may comprise at least one of silicon dioxide, zirconium oxide, or titanium oxide. In various embodiments, after densifying the carbon structure, the plurality of silicon carbide whiskers may comprise 5% to 35% by weight of the carbon structure.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

DETAILED DESCRIPTION

All ranges and ratio limits disclosed herein may include their upper and lower limits and may be combined. It is to be understood that unless specifically stated otherwise, references to "a," "an," and/or "the" may include one or more than one and that reference to an item in the singular may also include the item in the plural.

The detailed description of exemplary embodiments herein makes reference to the accompanying drawings, which show exemplary embodiments by way of illustration, and not of limitation. While these exemplary embodiments are described in sufficient detail to enable those skilled in the art to practice the exemplary embodiments of the disclosure, it should be understood that other embodiments may be realized and that logical changes and adaptations in design and construction may be made in accordance with this disclosure and the teachings herein. Thus, the detailed description herein is presented for purposes of illustration only and not limitation. The steps recited in any of the method or process descriptions may be executed in any order and are not necessarily limited to the order presented or the exemplary process in which the steps appear in this disclosure. That is, steps recited in any of the method or process descriptions may be applied to and/or removed from any of the exemplary methods or processes described herein. Moreover, many of the functions or steps may be outsourced to or performed by one or more third parties. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Figure 1:
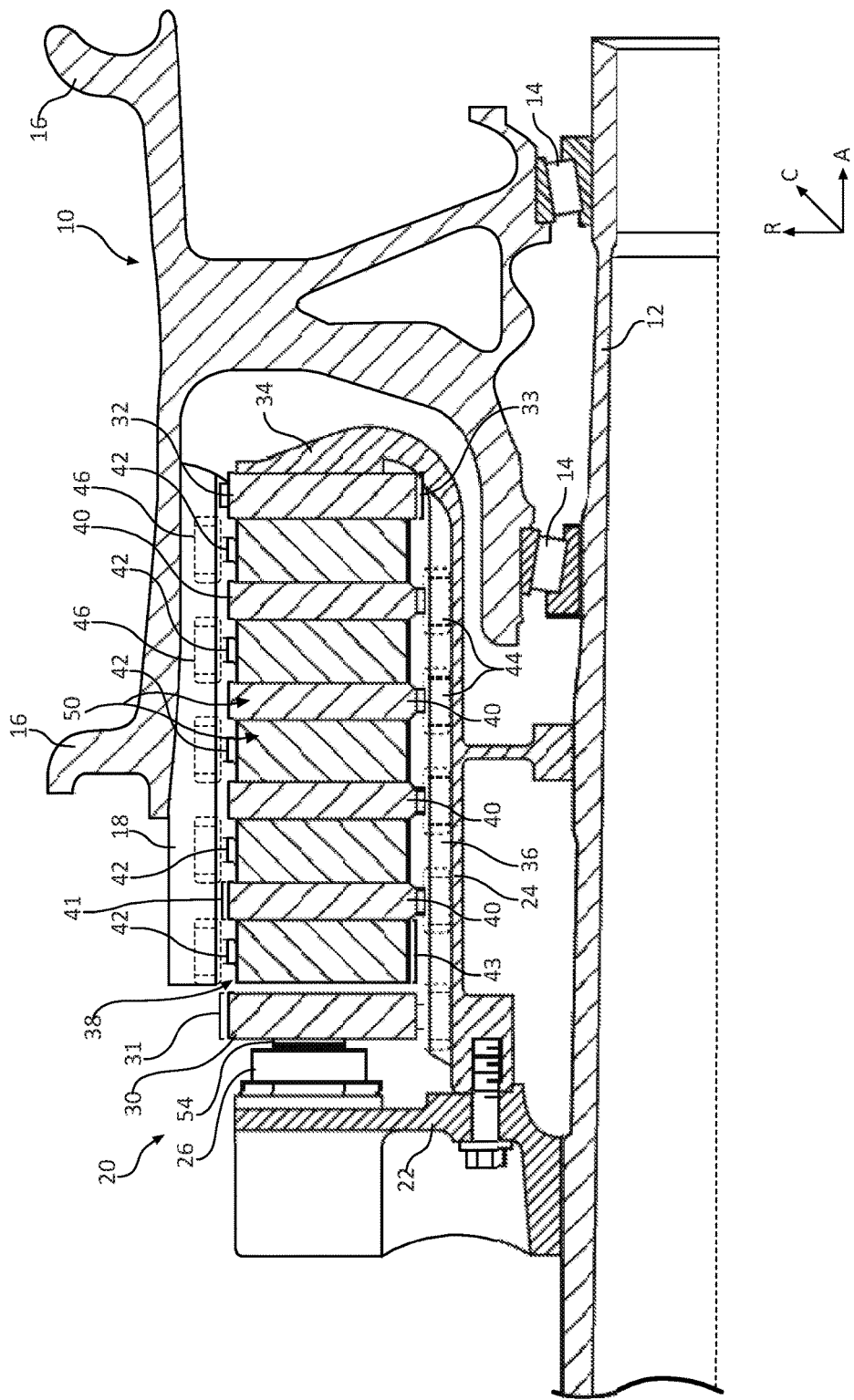
FIG. 1 illustrates a disk brake system, in accordance with various embodiments.

With reference to FIG. 1, a disk brake system 20 is illustrated. In various embodiments, the disk brake system 20 may be used to reduce the speed of a wheel of an aircraft. An A-R-C axis has been included in the drawings to illustrate the axial (A), radial (R) and circumferential (C) directions. The system may include a wheel 10 supported for rotation around an axle 12 by bearings 14. The wheel 10 includes rims 16 for supporting a tire, and a series of axially extending rotor splines 18 (one shown). Rotation of the wheel 10 is modulated by the disk brake system 20. The disk brake system 20 includes a torque flange 22, a torque tube 24, a plurality of pistons 26 (one shown), a pressure plate 30, and an end plate 32. Pressure plate 30 comprises a pressure plate thickness 31, and end plate 32 comprises an end plate thickness 33. In various embodiments, the pressure plate 30 and the end plate 32 are annular disks. The torque tube 24 is an elongated annular structure that includes a reaction plate 34 and a series of axially extending stator splines 36 (one shown). The reaction plate 34 and stator splines 36 may be integral with the torque tube 24 as shown in FIG. 1, or attached as separate components.

In accordance with various embodiments, the disk brake system 20 also includes a plurality of friction disks 38. The plurality of friction disks 38 includes at least one non-rotatable friction disk, also known as a stator friction disk 40 comprising a stator thickness 41, and at least one rotatable friction disk, also known as a rotor friction disk 42 comprising a rotor thickness 43. Each of the plurality of friction disks 38 includes an attachment structure. As shown in FIG. 1, each of four stator friction disks 40 include a plurality of stator lugs 44 at circumferentially spaced positions around the stator friction disk 40 as an attachment structure. Similarly, each of five rotor friction disks 42 include a plurality of rotor lugs 46 at circumferentially spaced positions around the rotor friction disk 42 as an attachment structure. In various embodiments, and as shown in FIG. 1, the pressure plate 30, end plate 32, and friction disks 38 are all annular disks.

The torque flange 22 is mounted to the axle 12. The torque tube 24 is bolted to the torque flange 22 such that the reaction plate 34 is near an axial center of the wheel 10. The end plate 32 is connected to a surface of the reaction plate 34 facing axially away from the axial center of the wheel 10. Thus, the end plate 32 is non-rotatable by virtue of its connection to the torque tube 24. The stator splines 36 support the pressure plate 30 so that the pressure plate 30 is also non-rotatable. The stator splines 36 also support the stator friction disks 40. The stator friction disks 40 engage the stator splines 36 with gaps formed between the stator lugs 44. Similarly, the rotor friction disks 42 engage the rotor splines 18 with gaps formed between the rotor lugs 46. Thus, the rotor friction disks 42 are rotatable by virtue of their engagement with the rotor splines 18 of the wheel 10.

As shown in FIG. 1, the rotor friction disks 42 are arranged with the end plate 32 on one end, the pressure plate 30 on the other end, and the stator friction disks 40 interleaved so that the rotor friction disks 42 are adjacent to non-rotatable friction components. In various embodiments, the number of rotor friction disks 42 and stator friction disks 40 may vary according to the brake assembly design. The pistons 26 are connected to the torque flange 22 at circumferentially spaced positions around the torque flange 22. The pistons 26 face axially toward the wheel 10 and include pucks 54 that contact a side of the pressure plate 30 opposite the rotor friction disks 42. The pistons 26 may be powered electrically, hydraulically or pneumatically.

In various embodiments, prior to operation of the disk brake system 20, pistons 26 are not actuated and gaps exist between each of rotor friction disks 42 and each of the non-rotatable friction components, namely pressure plate 30, end plate 32, and stator friction disks 40. The gaps are formed by the axial spreading out of the rotor friction disks 42 along the rotor splines 18; and the stator friction disks 40, and the pressure plate 30 along the stator splines 36 due to the movement of the rotor friction disks 42 adjacent to the non-rotatable friction components. During operation of the disk brake system, pistons 26 are actuated, forcing the pressure plate 30 to move along stator splines 36 against the plurality of the friction disks 38, forcing them axially toward the end plate 32 and reaction plate 34. Squeezed between the pressure plate 30 and the reaction plate 34, the gaps are eliminated as friction surfaces contact other friction surfaces.

The friction disks 38 of the disk brake system 20 may be comprised of carbon structures comprising carbon composite material. Contact between friction disks 38 during operation of the disk brake system 20 as described above causes the friction disks 38 to wear over time. In various embodiments, in order to improve the wear rate of the friction disks 38, ceramic particles may be incorporated into the carbon structures during the fabrication process of the carbon composite material comprised in the friction disks 38.

In various embodiments, it may be desirable to incorporate the hard ceramic materials into the carbon structure to improve wear resistance, heat capacity, and/or oxidation resistance of the carbon composite material comprised in friction disks 38. Silicon carbide (SiC), for example, may be incorporated into wear products such as friction disks 38, to add strength and hardness to friction disks 38, and therefore, improve wear resistance, heat capacity, and/or oxidation resistance of friction disks 38. In various embodiments, silicon carbide whiskers may be incorporated into a pore or the porosity (i.e., multiple pores) of a carbon structure. Such incorporation of silicon carbide whiskers may provide additional fibrous reinforcement to the carbon structure.

In various embodiments, in each of the friction disks 38, the carbon composite material 50 may comprise 5% to 35% by weight silicon carbide whiskers in the finished carbon-carbon structure. As used herein "silicon carbide whiskers" may be used to describe a high modulus rigid rod (including nano wires and/or platelets) formed of silicon carbide that has a large length to diameter ratio (i.e., the diameter of a silicon carbide whisker may range from nano to micro size, and the length of the silicon carbide whisker may be orders of magnitude greater than the diameter). For example, the cross-sectional diameter of a silicon carbide whisker may be from 20 nm to 10 μm, and the length of the silicon carbide whisker may be orders of magnitude greater than the diameter.

The processes disclosed herein may include treatments for producing carbon fiber reinforced carbon composite material. Thus, as used herein the term "carbon structure" may be used to describe a carbon preform, a carbon fiber reinforced carbon material at various stages of densification, a carbon structure prior to densification and carbon reinforcement, and/or a finished carbon composite material.

The processes for treating carbon structures disclosed herein further include infiltration of a silicon compound preparation, comprising a silicon source and/or a carbon source. As used herein, "silicon compound preparation" describes a suspension comprising silicon compounds and/or carbon compounds, and the silicon compound preparation may be a colloidal suspension and/or a silicon sol gel for infiltration into a carbon structure. As used herein, "ceramic" in connection with "particles", "suspension", "sol gel", etc. means that the particles, colloidal suspension, sol gel, etc. comprise one or more silicon compounds and/or carbon compounds.

Figure 2:
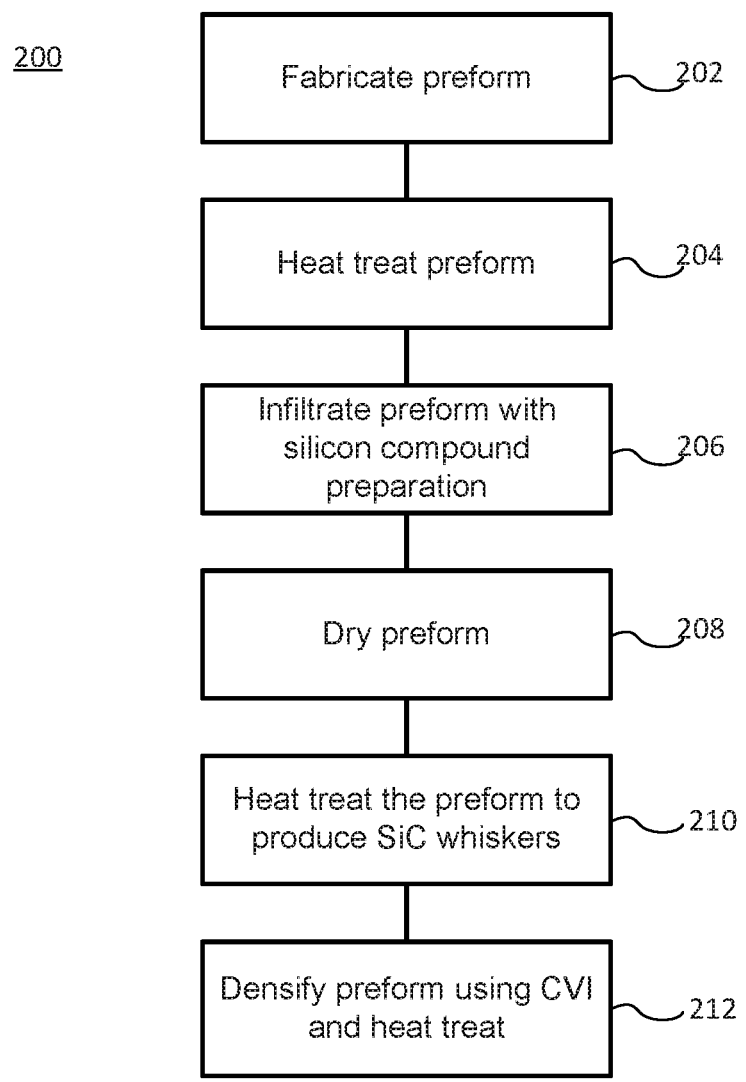
FIG. 2 illustrates a process for forming carbon structures with a single infiltration of a silicon compound preparation followed by chemical vapor infiltration (CVI) densification, in accordance with various embodiments.

With reference to FIG. 2, a process 200 for treating a carbon fiber reinforced carbon structure is shown, in accordance with various embodiments. A preform (which may be referred to as "preform") may be fabricated (Step 202). The preform or carbon structure may comprise a porous structure (i.e., comprising many pores within the carbon structure). A porous structure may comprise any porous structure derived from a fibrous material such as carbon fibers or the like. The carbon fibers may be derived from polyacrylonitrile (PAN), rayon (synthetic fiber derived from cellulose), pitch, or the like. The starting fiber may be pre-oxidized PAN or fully carbonized commercial carbon fiber. The preform is preferably prepared using needling of individual textile layers. The individual brake preform may be fabricated using a net shape preforming technology or may be cut from a needled board. Alternatively, preforms may be a 2D lay-up of woven, braided or knitted fabric. The fibrous material may be in the form of chopped carbon fibers molded and/or needled to form a preform. Prior to the densification process, the fibrous material may be formed into a preform having any desired shape or form. For example, the porous structure may be in the form of a disk having any shape such as, for example, a polygon, a cylinder, a triangle, annular, square, rectangle, pentagon, hexagon, octagon, or the like. In addition, the porous structure may have an irregular form.

In various embodiments, the preform may be heat treated (Step 204) at temperatures from 1000° C. (1832° F.) to 2400° C. (4352° F.). In various embodiments, the preform may be heat treated at temperatures from 1000° C. (1832° F.) to 2200° C. to (3992° F.). In various embodiments, the preform may be heat treated at temperatures from 1200° C. (2192° F.) to 2000° C. (3632° F.). In various embodiments, the preform may be heat treated at temperatures from 1400° C. (2552° F.) to 1800° C. (3272° F.). Heat treatments described herein may further vary in temperatures and/or durations.

In various embodiments, the preform may be infiltrated with a silicon compound preparation that is at least one of a colloidal ceramic suspension or sol gel solution prepared with a selected ceramic content of silicon compounds and/or carbon compounds (Step 206). For example, an aqueous colloidal ceramic suspension comprising silicon compounds and/or carbon compounds may be introduced in the carbon composite as described in detail below. The silicon source for the silicon compound preparation may comprise silicon nitride ($Si_3N_4$), silicon dioxide ($SiO_2$), silicon monoxide (SiO), and/or a crystalline or amorphous form of silica (such as fumed silica, a hydrated colloidal silica suspension, silicic acid, and/or sol gel silica). "Silica" is another word for silicon dioxide. In various embodiments, an organic solvent may also be used to suspend the silicon compounds and/or carbon compounds. For a silicon compound preparation comprising a sol gel, the silicon source may comprise silicon alkoxides, such as tetraethyl orthosilicates and/or tetramethyl orthosilicates.

In various embodiments, a carbon source may be added to the silicon compound preparation, or in various embodiments, a carbon source may be comprised in a separate preparation. The carbon source may be in the form of one or several water soluble polymers such as a polyvinyl alcohol (PVA), sucrose, dextrose, maltose, polyvinylpyrrolidone (PVP), polyvinyl acetate, poly(2-oxazoline), polyacrylamide (PAM), polyethyleneimine (PEI), polyacrylate (PAA), organic carboxylic acid, polyvinyl butyral, and/or polyethylene glycol. In various embodiments, the polymer may be polyester, epoxy, or phenolic resin, any of which may be in an aqueous emulsion, or a combination of two or more polymers may also be used. The molecular weight and quantity of polymer may be chosen to maintain the overall viscosity of the colloidal suspension low in order to facilitate its infiltration within the carbon structure. In various embodiments, aqueous carbon black dispersions may be used as the additional carbon source, or to supplement a water-soluble polymer.

In various embodiments, the incorporation of a controlled starting amount of fine silicon compound particles and/or carbon compound particles throughout the carbon structure may lead, after various steps, to the formation of silicon carbide whiskers within and throughout the pores of the carbon structure. The fine silicon compound particles and/or carbon compound particles may comprise particle sizes ranging from the nano to the micro size (i.e., 1 nm to 1500 nm). Additives such as a wetting agent may be incorporated into the silicon compound preparation to facilitate wetting of the preform or of the partially densified carbon structure. During subsequent heat treatments of the carbon structure under an inert atmosphere (i.e., under argon gas and/or nitrogen gas) at temperatures ranging from 1400° C. (2552° F.) to 1800° C. (3272° F.), or temperatures ranging from 1400° C. (2552° F.) to 1850° C. (3362° F.), carbo-thermal reduction of silicon compounds and/or carbon compounds may occur, yielding silicon carbide whiskers. In various embodiments, the heat treatments for the carbo-thermal reduction of silicon compounds and/or carbon compounds may be conducted at temperatures ranging from 1500° C. (2732° F.) to 1700° C. (3092° F.). In various embodiments, the heat treatments for the carbo-thermal reduction of silicon compounds and/or carbon compounds may be conducted at temperatures ranging from 1600° C. (2912° F.) to 1700° C. (3092° F.).

The carbon source may be comprised of several components serving specific roles in the process of forming silicon carbide whiskers in the carbon structure. In various embodiments, the carbon source in the silicon compound preparation may serve to limit reaction between the silicon compounds and the carbon in the carbon structure. This may be accomplished by incorporating various carbon sources and/or additional polymers with various carbon char yields upon carbonization into the silicon compound preparation. Incorporating the various carbon sources and/or additional polymers into the silicon compound preparation may adjust the silicon to carbon ratio for the silicon compounds and carbon compounds participating in the silicon carbide whisker formation. For example, carbon black with a carbonization yield of 99% carbon, phenolic resin with a carbon yield of 50-60% carbon and sucrose with a carbon yield of 20% may be used by themselves or in combination as carbon source(s). Use of a low carbon yield carbon compound(s) by itself or in combination with carbon black may be advantageous to develop the porosity in the carbon structure prior to bringing the carbon structure to the temperature at which carbo-thermal reduction of silicon compounds and/or carbon compounds will occur to form silicon carbide whiskers. Open porosity in the carbon structure is desirable for gaseous exchanges during the carbo-thermal reduction to optimize silicon carbide whisker growth. Incorporation of additional polymers like PVA, phenolic resin or sucrose may be done alone or in conjunction with carbon black in order to adjust reaction stoichiometry and/or tailor microstructure of silicon/carbon compound inside the carbon structure.

In various embodiments, a carbon source comprising an organic dispersing agent may be incorporated into the silicon compound preparation to coat the silicon compounds with a thin layer of carbon to facilitate de-agglomeration of silicon compounds which may better distribute the carbon and silicon compounds within the pores of the carbon structure. Forming smaller particles of silicon and/or carbon compounds may facilitate the reaction between the silicon compounds and carbon compounds during the carbo-thermal reduction, resulting in increased formation of silicon carbide whiskers.

In various embodiments, the pH of the silicon compound preparation may be adjusted before or after the addition of the carbon source. For example, the pH of the ceramic suspension may be made more basic by adding ammonium hydroxide or other similar Arrhenius base.

In embodiments including silicon carbide whisker synthesis using a silicon compound preparation comprising silicon nitride, the overall chemical reaction may proceed as follows:

$$Si_3N_4 + 3C \longrightarrow 3SiC + 2N_2 \quad (1)$$

The stoichiometric composition of the reactants for reaction (1) corresponds to 79.6% silicon nitride by weight and 20.4% carbon by weight. The stoichiometric weight ratio of carbon to silicon nitride may be 0.26.

In various embodiments, the starting ratio of carbon to silicon nitride affects the structure of the silicon carbide whiskers. Well-formed silicon carbide whiskers comprising rod structures (i.e., minimal formation of silicon carbide platelets and/or particles) may be synthesized with low carbon content (i.e., a low carbon to silicon nitride ratio, such as 0.04 to 0.15 ratio by weight). Intermediate carbon content (i.e., a weight ratio of carbon to silicon nitride of 0.015 to 0.26) may form silicon carbide whiskers comprising rods and platelets, platelets being less desirable in various embodiments. With high carbon content (i.e., a weight ratio of carbon to silicon nitride of greater than 0.26), primarily platelets and particles of silicon carbide may be formed, while few or no rod-shaped silicon carbide whiskers are formed. Therefore, the ratio of carbon to silicon nitride in the starting materials for the carbo-thermal reduction may comprise a carbon to silicon nitride ratio of between 0.04 and 0.26 by weight in order to facilitate desired silicon carbide whisker formation.

In order to achieve a low carbon to silicon nitride ratio (lower than the stoichiometric ratio), in addition to selecting a suitable ratio of carbon compound to silicon nitride ratio, the internal surface of the carbon structure may be coated with a thin film of silicon dioxide prior to introducing the silicon compound preparation comprising silicon nitride. Silicon dioxide is a generally reactive form of silicon compound, and therefore, the addition of a small amount of silicon dioxide may increase the rate of silicon carbide whisker formation during carbo-thermal reduction. Additionally, the rate of silicon carbide whisker formation during carbo-thermal reduction may also be increased by adding colloidal silicon dioxide and/or silicon monoxide (more reactive silicon compounds than silicon nitride) to the silicon compound preparation comprising silicon nitride. A low carbon to silicon nitride ratio may also be achieved by the addition of a stoichiometric adjustment preparation, as discussed herein.

In embodiments including silicon carbide whisker synthesis using a silicon compound preparation comprising silicon dioxide, the overall chemical reaction may proceed as follows:

$$SiO_2 + 3C \longrightarrow SiC + 2CO \quad (2)$$

The stoichiometric composition of the reactants for reaction (2) corresponds to 62.5% silicon dioxide by weight and 37.5% carbon by weight. The stoichiometric weight ratio of carbon to silicon dioxide may be 0.6. Well-formed silicon carbide whiskers comprising rods (i.e., minimal formation of silicon carbide platelets and particles) may be successfully synthesized using silicon dioxide over a wide range of carbon to silicon dioxide weight ratios, including weight ratios above the stoichiometric composition. Therefore, the ratio of carbon to silicon dioxide in the starting materials for the carbo-thermal reduction may comprise a carbon to silicon dioxide ratio of between 0.3 and 0.9 by weight.

In embodiments including silicon carbide whisker synthesis using a silicon compound preparation comprising silicon monoxide, the overall chemical reaction may proceed as follows:

$$SiO + 2C \longrightarrow SiC + CO \quad (3)$$

The stoichiometric composition of the reactants for reaction (3) corresponds to 64.7% silicon monoxide by weight and 35.3% carbon by weight. The stoichiometric weight ratio of carbon to silicon monoxide may be 0.5. The ratio of carbon to silicon monoxide in the starting materials for the carbo-thermal reduction may comprise a carbon to silicon monoxide ratio of between 0.3 and 0.9 by weight.

In various embodiments, a catalyst may be introduced to the silicon compound preparation and/or the carbon structure to accelerate the formation of silicon carbide whiskers during carbo-thermal reduction. The catalyst may comprise a nickel, iron, cobalt, and/or titanium compound. In embodiments where a catalyst is used, the catalyst to silicon molar ratio may be between 0.01 and 0.25.

In various embodiments, the silicon compound preparation, which may be an aqueous ceramic suspension, or slurry, may infiltrate the porosity of a carbon preform, the porosity of partially densified carbon structure, and/or other carbon structure. The porosity of a carbon structure refers to the pores, or spaces, within the fibrous network. The infiltration may be conducted by immersing the carbon preform or partially densified carbon structure in the silicon compound preparation. In various embodiments, infiltration may be conducted following evacuation of the pores of the carbon structure using a vacuum chamber.

In various embodiments, following introduction of the silicon compound preparation within the carbon structure, the carbon structure may be dried to remove water. The content of silicon compounds and/or carbon compounds in the aqueous ceramic suspension or silicon compound preparation may be selected to form silicon carbide whiskers of a targeted amount in the pores of the finished carbon composite. The targeted amount of silicon carbide whiskers may range from 5% to 35% by weight the finished carbon composite. That range may provide additional fibrous reinforcement to the carbon structure and improve its wear performance when used in applications such as brake disks, without negatively impacting the mechanical properties of the carbon structure. For example, if a finished carbon-carbon structure comprises more than 35% by weight silicon carbide whiskers, silicon carbide whiskers may be too close to one another to allow adequate infiltration and/or formation of the silicon carbide whiskers into the pores of the carbon structure.

Figure 4:
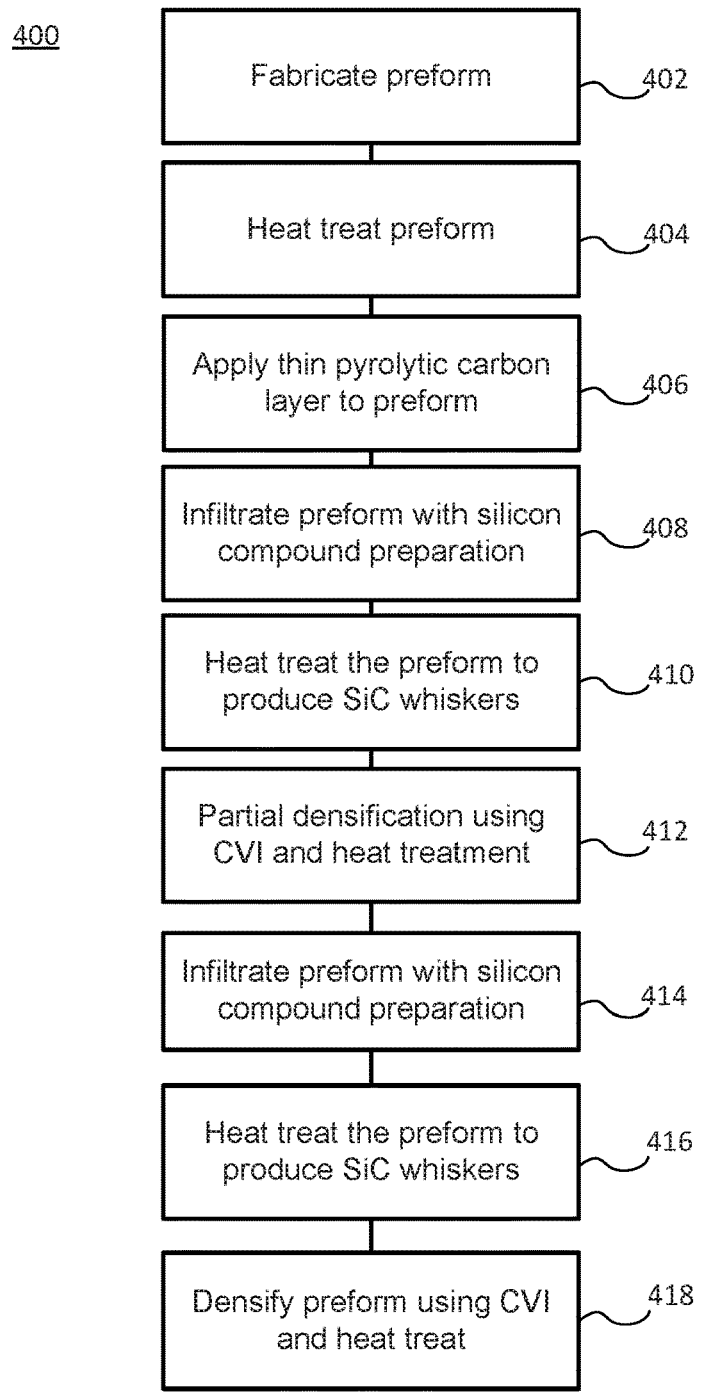
FIG. 4 illustrates a process for forming carbon structures comprising multiple infiltrations of a silicon compound preparation and multiple CVI densification steps, in accordance with various embodiments.
Figure 5:
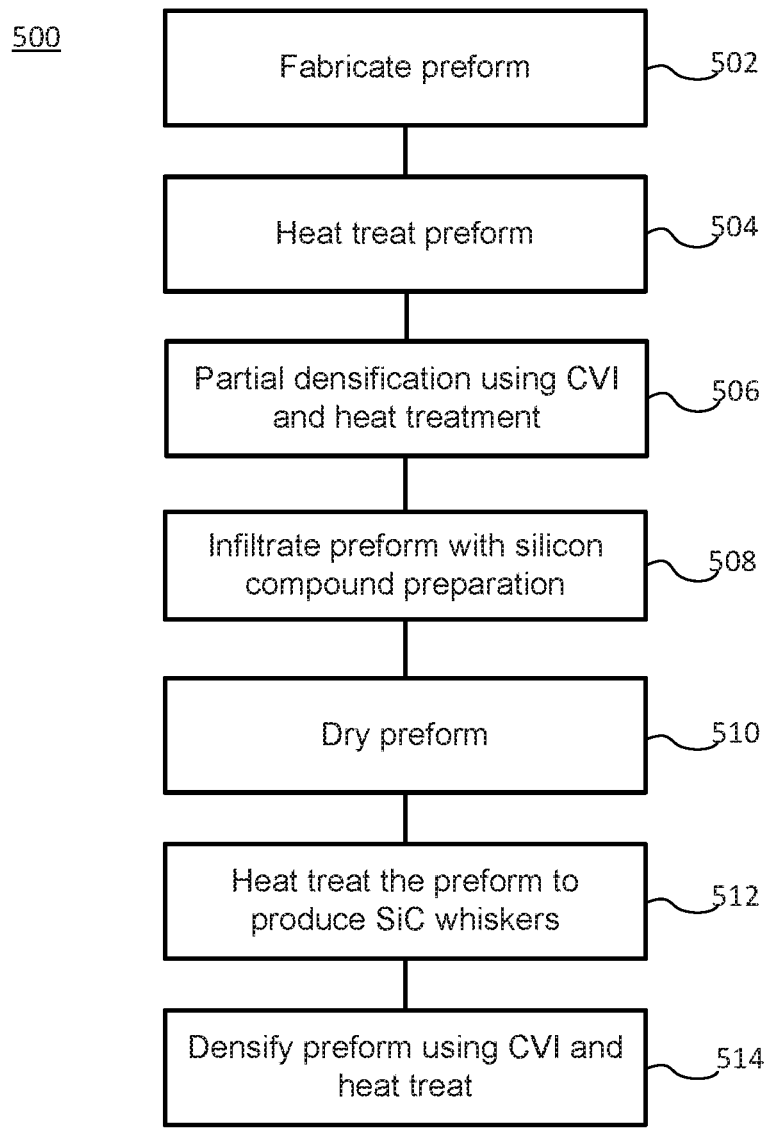
FIG. 5 illustrates a process for forming carbon structures with infiltration of a silicon compound preparation following a partial CVI densification, in accordance with various embodiments.

In various embodiments, the silicon compounds and/or carbon compounds in the silicon compound preparation may infiltrate the carbon structure at one stage of the carbon composite fabrication, for example at the preform level, as shown in Step 206 of FIG. 2, or after a partial CVI densification, as shown in Step 508 of FIG. 5. In various embodiments, the silicon compounds and/or carbon compounds in the silicon compound preparation may infiltrate carbon structure at several stages of the carbon composite fabrication as illustrated, for example in Steps 408 and 414 of FIG. 4. For example, the ceramic particles may be partially introduced into the preform before and after partial CVI pyrolytic densification.

Following drying of the silicon compound preparation incorporated within the carbon structure, the preform or partially densified carbon structure may be heat treated to a suitable temperature (e.g. 1400° C. (2552° F.) to 1800° C. (3272° F.), or 1400° C. (2552° F.) to 1850° C. (3362° F.)) in an inert environment (i.e., under argon gas and/or nitrogen gas) so as to form the silicon carbide whiskers via carbo-thermal reduction of the silicon compounds. The duration of the carbo-thermal reduction may be between 10 minutes and 10 hours.

In various embodiments, following one or more carbo-thermal reduction steps at a temperature of 1400° C. (2552° F.) to 1850° C. (3362° F.), the carbon structure comprising silicon carbide whiskers may be subjected to a final CVI pyrolytic carbon densification step, for example Steps 212, 316, 418, and 514, in FIGS. 2, 3, 4, and 5, respectively. Final CVI densification may take place at a temperature of 900° C. (1652° F.) to 1100° C. (2012° F.). In various embodiments, heat treatment may be conducted only after specific CVI densification cycles, for example, following the final CVI densification step (212, 316, 418, and 514, in FIGS. 2, 3, 4, and 5, respectively). Alternatively, the carbon structure heat treatment may be conducted after each additional CVI densification step. The final CVI densification and/or final heat treatment may be conducted in the same furnace as the carbo-thermal reduction in order to minimize safety hazards associated with handling silicon carbide whiskers, which can include adverse respiratory effects if silicon carbide whiskers are inhaled.

Returning to FIG. 2, after silicon compound preparation infiltration (Step 206), the preform may be dried (Step 208). The preform may be heat treated at a temperature of 1400° C. (2552° F.) to 1800° C. (3272° F.), or 1400° C. (2552° F.) to 1850° C. (3362° F.), to form silicon carbide whiskers (Step 210) in the pores of the preform. The preform may be densified using one or multiple CVI cycles (Step 212). Each CVI cycle may be followed by a heat treatment, as depicted in Step 212. The carbon structure may be subjected to a heat treatment between 1000° C. (1832° F.) and 1600° C. (2912° F.), for example, and/or between 1400° C. (2552° F.) to 1800° C. (3272° F.), or between 1400° C. (2552° F.) to 1850° C. (3362° F.). The heat treatment following the final CVI densification (Step 212) may occur to modify the characteristics of the pyrolytic carbon. These subsequent heat treatments may take place for between 15 minutes and 20 hours, and under a vacuum or at atmospheric pressure, under flow of nitrogen gas and/or argon gas.

Figure 3:
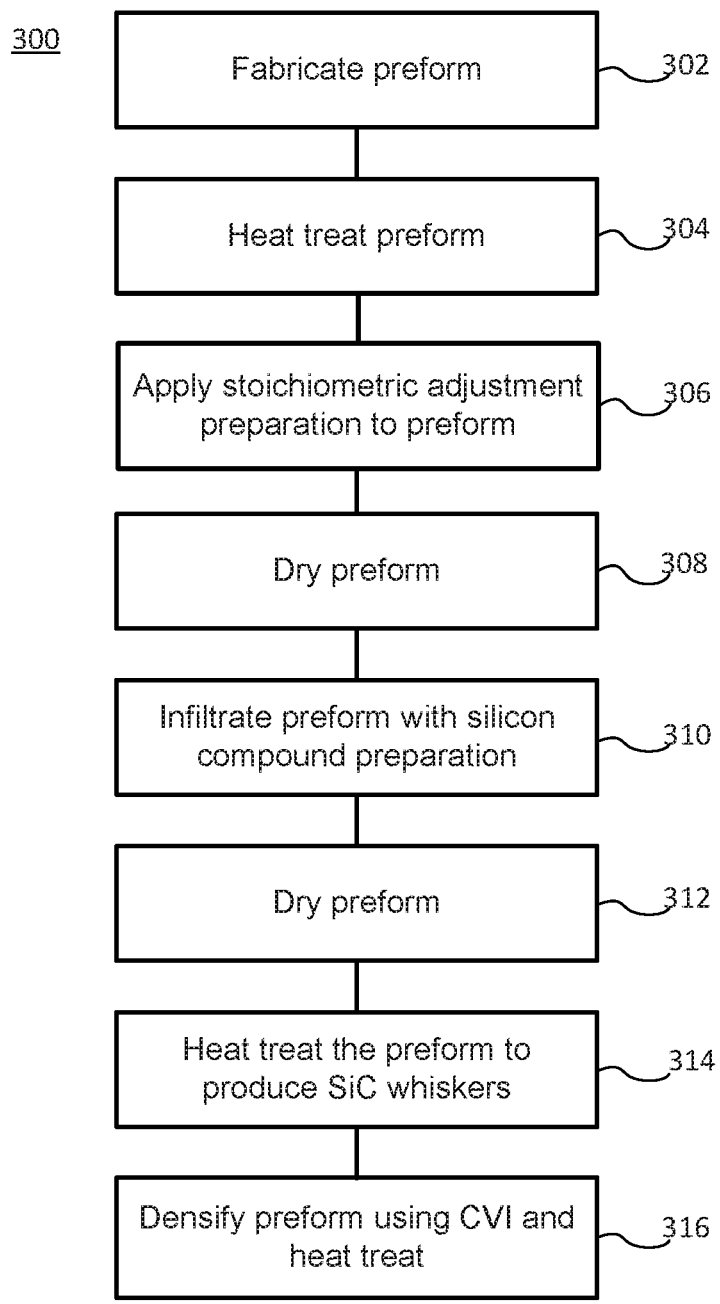
FIG. 3 illustrates a process for forming carbon structures comprising infiltration of a stoichiometric adjustment preparation and infiltration of a silicon compound preparation, in accordance with various embodiments.

With reference to FIG. 3, a process 300 for treating a preform is shown, in accordance with various embodiments. Process 300 is similar to process 200 of FIG. 2 in that process 300 may begin by fabricating a preform (Step 302) and heat treating the preform (Step 304). Process 300 may also end with densifying the preform using CVI and heat treating the carbon structure following each CVI cycle (Step 316) in a manner similar to that of Step 212 of FIG. 2. The step of infiltrating the preform with a silicon compound preparation comprising silicon and carbon compounds (Step 310) and drying the preform (Step 312) may also be similar to the infiltration of Step 206 and drying of Step 208 of FIG. 2.

In various embodiments, a stoichiometric adjustment preparation comprising silicon dioxide, titanium oxide, and/or zirconium oxide may be applied to the preform (Step 306). The stoichiometric adjustment preparation may be applied to the preform to offset the carbon amount present in the preform after the infiltration by the silicon compound preparation. The stoichiometric adjustment preparation may isolate the carbon fiber or added thin pyrolytic carbon layer from the overall carbon content in the silicon compound preparation. Before infiltration of the preform by the silicon compound preparation, the preform may be dried (Step 308). Following silicon compound preparation infiltration (step 310) and/or drying the preform (Step 312), the preform may be heat treated. In various embodiments, the heat treatment may cause some or all of the silicon (in silicon dioxide), the zirconium, and/or the titanium in the stoichiometric adjustment preparation to react with the carbon source in a carbo-thermal reduction producing silicon carbide, zirconium carbide, and/or titanium carbide, respectively, in a stoichiometric adjustment coating. The stoichiometric adjustment preparation may function to prevent or minimize carbon fiber and/or the pyrolytic carbon layer in the carbon structure from contributing to the carbon source in the silicon compound preparation for the carbo-thermal reduction reaction. Therefore, the carbon to silicon nitride ratio may decrease below the stoichiometric ratio. A benefit of using titanium oxide in the stoichiometric adjustment preparation is that titanium carbide may be desirable to include into the carbon structure, because titanium carbide is a hard ceramic material which improves wear performance of the carbon structure. In various embodiments, the heat treatment may form silicon carbide whiskers (Step 314), similar to Step 210 in FIG. 2.

With reference to FIG. 4, a process 400 for treating a preform and/or partially densified carbon structure is shown, in accordance with various embodiments. Process 400 is similar to process 200 of FIG. 2 in that process 400 may begin by fabricating a preform (Step 402) and heat treating the preform (Step 404). Process 400 may also end with densifying the preform using CVI and heat treating the carbon structure following each CVI cycle (Step 418) in a manner similar to that of process 200 of FIG. 2. The steps of infiltrating the preform with a silicon compound preparation comprising silicon compounds and/or carbon compounds (Step 408 and 414) may also be similar to the infiltration of Step 206 of FIG. 2 but applied at different times. The first infiltration step (Step 408) may be applied after the preform is fabricated and heat treated but before a partial CVI densification (Step 412), which may include a heat treatment step. The second infiltration step (Step 414) may be applied after partial densification using CVI (Step 412). After each infiltration Step 408 and 414, the preform may be dried and heat treated to form silicon carbide whiskers (Step 410 and Step 416), similar to Step 210 in FIG. 2. After the second infiltration step (Step 414) and heat treatment to form silicon carbide whiskers (Step 416), the partially densified carbon structure may be dried, and then densified using CVI and heat treated (Step 418). Thus, silicon compound preparation infiltration and silicon carbide whisker formation may occur on two or more separate occasions in process 400. Additional partial CVI and/or heat treatment steps may separate the various silicon compound preparation infiltration steps and/or silicon carbide whisker formation steps. The carbon structure may be infiltrated by the silicon compound preparation and/or partially densified as many times as desired. Additionally, in various embodiments, before the first silicon compound preparation infiltration Step 408, a thin pyrolytic carbon layer may be applied to the carbon structure (Step 406) to prevent interaction between the silicon compounds and the carbon fibers of the carbon structure, and/or a stoichiometric adjustment preparation may be applied to the carbon structure similar to Step 306 in FIG. 3. The thin pyrolytic carbon layer may be applied to the carbon structure by heat treating the carbon structure and conducting CVI pyrolytic carbon densification. In various embodiments, a thin pyrolytic carbon layer and/or a stoichiometric adjustment preparation may be applied to the carbon structure as many times as desired. Each application of a thin pyrolytic carbon layer and/or a stoichiometric adjustment preparation to the carbon structure may take place before, during, or after a step comprising infiltration of the carbon structure by the silicon compound preparation.

With reference to FIG. 5, a process 500 for treating a preform is shown, in accordance with various embodiments. Process 500 is similar to process 200 of FIG. 2 in that process 500 may begin with fabricating a preform (Step 502) and heat treating the preform (Step 504), and end with densifying the preform using CVI and heat treating the carbon composite (Step 514). Infiltrating the preform with the silicon compound preparation (Step 508) may be similar to the infiltration step of process 200 of FIG. 2 (i.e., Step 206 of FIG. 2) but applied at a different time(s). Infiltrating the preform with a silicon compound preparation comprising silicon compounds and/or carbon compounds (Step 508) may occur after the preform is partially densified using CVI (Step 506) and heat treated following the CVI. After the infiltration Step 508, the preform may be dried (Step 510) and heat treated to form silicon carbide whiskers (Step 512), similar to Steps 208 and 210 in FIG. 2, respectively.

Traditionally, silicon carbide whiskers that are incorporated into carbon structures and/or ceramic structures may be synthesized outside of the carbon structure and then separately incorporated, or incorporated into a carbon structure a number of other ways, such as pre-ceramic polymer, CVI, and/or silicon melt. However, these processes may not allow introduction of long silicon carbide whiskers into a three-dimensionally reinforced carbon structure, and/or may result in poor silicon carbide whisker distribution in a two-dimensional carbon structure, and instead may result in large pockets of silicon carbide. Also, handling silicon carbide whiskers may be hazardous to health, as discussed herein. Therefore, by producing silicon carbide whiskers within the pores of the carbon structure, a desired amount and length of the silicon carbide whiskers may be achieved, and the health hazards of handling silicon carbide whiskers are avoided, while still receiving the benefits of the additional fibrous reinforcement caused by the silicon carbide whiskers within the carbon structure.

Implementing the various steps, techniques, combinations, compounds, etc. discussed herein, below are various examples of incorporating silicon carbide whiskers into carbon structures. The examples all begin with a fabricated and heat treated preform, produced from steps similar to Steps 202 and 204 in FIG. 2.

Example 1: (Based on a Thin Pyrolytic Carbon Layer Followed by Light Silica Coating)

A preform is subjected to a short heat treatment, at a temperature of 2300° C. (4172° F.), for example, and subsequently to a very short CVI pyrolytic carbon densification so as to provide a thin pyrolytic carbon layer at the surface of the carbon fibers of the carbon structure. The preform is subsequently infiltrated with a stoichiometric adjustment preparation comprising a colloidal suspension of ammonia stabilized silicon dioxide with particle sizes of 20 nm at a concentration of 5% by weight so as to tend to minimize reaction between the silicon compounds and carbon fibers of the preform during carbo-thermal reduction, and to tend to minimize overall carbon content available for the carbo-thermal reaction (i.e., decrease the weight ratio of carbon to silicon nitride to below the stoichiometric level, as discussed herein). The preform is dried and then infiltrated with a silicon compound preparation comprising a colloidal suspension of silicon nitride powder and sucrose ("table" sugar), sucrose being the carbon source.

To prepare the silicon compound preparation, an aqueous suspension containing 19% silicon nitride powder with a high surface area of 10 m$^2$/g is first prepared. pH is adjusted to 11 using ammonium hydroxide. The silicon nitride is deagglomerated using a high energy mixer such as an attrition mill or a high shear mixer. Sucrose is added and dissolved to have a weight ratio of sugar to silicon nitride of 0.65. This corresponds to a carbon to silicon nitride weight ratio of 0.13 following drying and carbonization of the sucrose. (Carbonization may be the heat treating of the carbon structure to burn away materials other than those desired materials, i.e., carbon compounds and/or silicon compounds). A wetting agent is added to the colloidal suspension so as to facilitate the wetting of the carbon structure, and/or may be part of the heat treatment used to form silicon carbide whiskers.

The preform is placed in a vacuum chamber and after evacuating the chamber, the silicon compound preparation is introduced in the porosity of the preform. Following drying, the preform comprising silicon compounds and carbon particles is loaded in a CVI furnace and taken to 1550° C. (2822° F.) under flowing argon gas and/or nitrogen gas. During the initial part of the heat treatment the sucrose is carbonized. During a hold of three hours at 1550° C. (2822° F.), silicon carbide whiskers are formed by the carbo-thermal reduction of silicon nitride. Following the formation of silicon carbide whiskers, the temperature of the furnace is lowered to a temperature compatible with CVI densification (i.e., 900° C. (1652° F.) to 1100° C. (2012° F.)). The carbon structure is subsequently densified through multiple CVI pyrolytic carbon and heat treatment cycles. Heat treatments are conducted at temperature between 1100° C. (2012° F.) and 1600° C. (2912° F.), or between 1400° C. (2552° F.) and 1800° C. (3272° F.). The silicon carbide whisker content may be about 15% by weight of the final carbon composite, wherein "about" as used in this context only means plus or minus 3% by weight. The silicon carbide whiskers may comprise about 12% by volume of the initial porosity of the preform, wherein "about" as used in this context only means plus or minus 3% by volume.

Example 2: (Based on a Thin Pyrolytic Carbon Layer Followed by Light Silica Coating)

A preform is subjected to a short heat treatment, at a temperature of 2000° C. (3632° F.), for example, and subsequently to a very short CVI pyrolytic carbon densification so as to provide a thin pyrolytic carbon layer at the surface of the carbon fibers of the carbon structure. The preform is subsequently infiltrated with a stoichiometric adjustment preparation comprising a colloidal suspension of ammonia stabilized silicon dioxide with particle sizes of 20 nm at a concentration of 5% by weight so as to tend to minimize reaction between the silicon compounds and carbon fibers of the preform during carbo-thermal reduction, and to tend to minimize overall carbon content available for the carbo-thermal reaction (i.e., decrease the weight ratio of carbon to silicon nitride to below the stoichiometric level, as discussed herein). The preform is subsequently infiltrated with a silicon compound preparation comprising a suspension of silicon nitride powder, polyvinyl butyral resin, carbon black, and a titanium catalyst with a solvent carrier such as acetone. The carbon black has a particle size of 30 nm and may be introduced as a suspension to limit heath related issues. The titanium catalyst may be titanocene dichloride. The various components are mixed in an organic solvent such as acetone and subjected to high shear mixing. The suspension may contain 22.5% by weight silicon nitride plus carbon black powders and 8% by weight polyvinyl butyral resin. The carbon black and silicon nitride powder are 2.5% by weight and 20% by weight of the suspension, respectively. The composition following carbonization corresponds to a carbon to silicon nitride ratio of 0.141. The amount of titanocene dichloride corresponds to a molar ratio of titanium to silicon of 0.11.

Following removal of the solvent by drying, the preform comprising silicon compounds and carbon particles is loaded in a CVI furnace and taken to 1800° C. (3272° F.) under flowing argon gas and/or nitrogen gas. During the initial part of the heat treatment, the polyvinyl butyral resin is carbonized. Following a hold of three hours at 1800° C. (3272° F.) to form silicon carbide whiskers through the carbo-thermal reduction of the silicon nitride, the temperature of the furnace is lowered to a temperature compatible with CVI densification (i.e., 900° C. (1652° F.) to 1100° C. (2012° F.)). The carbon structure is subsequently densified through multiple CVI pyrolytic carbon and heat treatment cycles. Heat treatments are conducted at temperature between 1100° C. (2012° F.) and 1600° C. (2912° F.), or between 1400° C. (2552° F.) and 1800° C. (3272° F.). The silicon carbide whisker content may be about 25% by weight of the final carbon composite, wherein "about" as used in this context only means plus or minus 3% by weight. The silicon carbide whiskers may comprise about 20% by volume of the initial porosity of the preform, wherein "about" as used in this context only means plus or minus 3% by volume.

Example 3

A preform is subjected to a short heat treatment, at a temperature of 1800° C. (3272° F.), for example, and subsequently to a very short CVI pyrolytic carbon densification so as to provide a thin pyrolytic carbon layer at the surface of the carbon fibers of the carbon structure. The preform is subsequently infiltrated with a stoichiometric adjustment preparation comprising a colloidal suspension of ammonia stabilized silicon dioxide with particle sizes of 20 nm at a concentration of 5% by weight so as to tend to minimize reaction between the silicon compounds and carbon fibers of the preform during carbo-thermal reduction, and to tend to minimize overall carbon content available for the carbo-thermal reaction (i.e., decrease the weight ratio of carbon to silicon nitride to below the stoichiometric level, as discussed herein). The preform is subsequently infiltrated with a silicon compound preparation comprising a colloidal suspension of silicon nitride powder, phenolic resin, and carbon black. The phenolic resin is a water based resin. To prepare the silicon compound preparation, the various components are mixed in water and subjected to high shear mixing or attrition milling. The suspension contains 18% by weight silicon nitride powder, 1.5% by weight carbon black powders, and 2% by weight phenolic resin. The composition following carbonization corresponds to a carbon to silicon nitride ratio of 0.141. A Wetting agent is added to the colloidal suspension so as to facilitate the wetting of the carbon structure.

The preform is dried and the resin is cured, and thereafter, the preform comprising silicon compounds and carbon particles is loaded in a CVI furnace and heated to 1800° C. (3272° F.) under flowing argon gas and/or nitrogen gas. During the initial part of the heat treatment the phenolic resin is carbonized. Following a hold of four hours at 1800° C. (3272° F.) to form the silicon carbide whiskers through the carbo-thermal reduction of the silicon nitride, the temperature of the furnace is lowered to a temperature compatible with CVI densification (i.e., 900° C. (1652° F.) to 1100° C. (2012° F.)). The carbon structure is subsequently densified through multiple CVI pyrolytic carbon and heat treatment cycles. Heat treatments are conducted at temperature between 1100° C. (2012° F.) and 1600° C. (2912° F.), or between 1400° C. (2552° F.) and 1800° C. (3272° F.). The silicon carbide whisker content may be about 20% by weight of the final carbon composite, wherein "about" as used in this context only means plus or minus 3% by weight. The silicon carbide whiskers may comprise about 16% by volume of the initial porosity of the preform, wherein "about" as used in this context only means plus or minus 3% by volume.

Example 4

A preform is subjected to a short heat treatment, at a temperature of 2000° C. (3632° F.), for example, and subsequently to a very short CVI pyrolytic carbon densification so as to provide a thin pyrolytic carbon layer at the surface of the carbon fibers of the carbon structure. The preform is subsequently infiltrated with a silicon compound preparation comprising a suspension of silicon nitride powder, polyvinyl butyral resin, polyethylene glycol, carbon black, and a titanium catalyst. The titanium catalyst may be titanocene dichloride. To prepare the silicon compound preparation, the various components are mixed in an organic solvent such as acetone and subjected to high shear mixing. The suspension contains 17% by weight silicon nitride, 3% by weight polyvinyl butyral resin, 14% by weight polyethylene glycol, and 3% by weight carbon black powder. The composition following carbonization corresponds to a carbon to silicon nitride weight ratio of 0.20. The amount of titanocene dichloride corresponds to a molar ratio of titanium to silicon of 0.15.

The preform is dried and the resin is cured, and thereafter, the preform comprising silicon compounds and carbon particles is loaded in a CVI furnace and taken to 1600° C. (2912° F.) under flowing argon gas and/or nitrogen gas. During the initial part of the heat treatment the polyvinyl butyral resin is carbonized. Following a hold of five hours at 1600° C. (2912° F.) to form the silicon carbide whiskers through the carbo-thermal reduction of the silicon nitride, the temperature of the furnace is lowered to a temperature compatible with CVI densification (i.e., 900° C. (1652° F.) to 1100° C. (2012° F.)). The carbon structure is subsequently densified through multiple CVI pyrolytic carbon and heat treatment cycles. Heat treatments are conducted at temperature between 1100° C. (2012° F.) and 1600° C. (2912° F.), or between 1400° C. (2552° F.) and 1800° C. (3272° F.). The silicon carbide whisker content may be about 20% by weight of the final carbon composite, wherein "about" as used in this context only means plus or minus 3% by weight. The silicon carbide whiskers may comprise about 16% by volume of the initial porosity of the preform, wherein "about" as used in this context only means plus or minus 3% by volume.

Example 5

A preform is subjected to a short heat treatment, at a temperature of 2200° C. (3992° F.), for example, and subsequently to a very short CVI pyrolytic carbon densification so as to provide a thin pyrolytic carbon layer at the surface of the carbon fibers of the carbon structure. The preform is subsequently infiltrated with a silicon compound preparation comprising a colloidal suspension of silicon nitride powder, silicon monoxide powder, phenolic resin, and carbon black. To prepare the silicon compound preparation, the various components are mixed to form an aqueous colloidal suspension and subjected to high shear mixing. The suspension contains 14% by weight silicon nitride powder, 2% by weight silicon monoxide powder, 4.25% by weight phenolic resin, and 2% by weight carbon black. The composition following carbonization corresponds to a carbon to silicon nitride plus silicon monoxide (C/($Si_3N_4$+SiO)) weight ratio of 0.26.

The preform is dried, and thereafter, the preform comprising silicon compounds and carbon particles is loaded in a CVI furnace and taken to 1700° C. (3092° F.) under flowing argon gas and/or nitrogen gas. During the initial part of the heat treatment the phenolic resin is carbonized. Following a hold of four hours at 1700° C. (3092° F.) to form silicon carbide whiskers through the carbo-thermal reduction of the silicon nitride and the silicon monoxide, the temperature of the furnace is lowered to a temperature compatible with CVI densification (i.e., 900° C. (1652° F.) to 1100° C. (2012° F.)). The carbon structure is partially densified through CVI pyrolytic carbon and heat treatment. Heat treatment is conducted at temperature between 1100° C. (2012° F.) and 1600° C. (2912° F.), or between 1400° C. (2552° F.) and 1800° C. (3272° F.). The partially densified carbon structure is subsequently infiltrated with the silicon compound preparation (similar to Step 414 in process 400). Following drying the partially densified carbon structure is subjected to another cycle of silicon carbide whiskers formation, CVI densification, and heat treatment at the temperatures discussed in this example. The overall silicon carbide whisker content introduced in two steps is about 19% by weight of the final carbon composite, wherein "about" as used in this context only means plus or minus 3% by weight. The silicon carbide whiskers may comprise about 12% by volume of the initial porosity of the preform, wherein "about" as used in this context only means plus or minus 3% by volume.

Example 6

A preform is subjected to a short heat treatment, at a temperature of 2200° C. (3992° F.), for example, and subsequently to a very short CVI pyrolytic carbon densification so as to provide a thin pyrolytic carbon layer at the surface of the carbon fibers of the carbon structure. The preform is subsequently infiltrated with a silicon compound preparation comprising a colloidal suspension of silicon dioxide particles, phenolic resin, carbon black, and a wetting agent. The colloidal silica is ammonia stabilized and has 20 nm size $SiO_2$ particles. To prepare the silicon compound preparation, the various components are mixed to form an aqueous colloidal suspension and subjected to high shear mixing. The suspension contains 12.5% by weight silicon dioxide particles, 4.25% by weight phenolic resin, and 5.4% by weight carbon black. The composition following carbonization corresponds to a carbon to silicon dioxide ratio of 0.6.

Following drying the preform and curing the resin, the preform containing silicon compounds and carbon particles is loaded in a CVI furnace and heated to 1600° C. (2912° F.) under flowing argon gas and/or nitrogen gas. During the initial part of the heat treatment, the phenolic resin is carbonized. Following a hold of five hours at 1600° C. (2912° F.) to form silicon carbide whiskers through the carbo-thermal reduction of the silicon dioxide, the temperature of the furnace is lowered to a temperature compatible with CVI pyrolytic carbon (i.e., 900° C. (1652° F.) to 1100° C. (2012° F.)). The carbon structure is subsequently densified through multiple CVI pyrolytic carbon and heat treatment cycles. Heat treatments are conducted at temperature between 1100° C. (2012° F.) and 1600° C. (2912° F.), or between 1400° C. (2552° F.) and 1800° C. (3272° F.). The silicon carbide whisker content may be about 16% by weight of the final carbon composite, wherein "about" as used in this context only means plus or minus 3% by weight. The silicon carbide whiskers may comprise about 12% by volume of the porosity of the preform, wherein "about" as used in this context only means plus or minus 3% by volume.

Example 7

To prepare a silicon compound preparation comprising a sol gel, tetraethylorthosilicate (TEOS) is first mixed with ethanol. Carbon black and cellulose nanofibers are added and mixed to the solution. The carbon to silica ratio is 0.6. The cellulose and carbon black respectively contribute to 31% and 69% of the carbonized carbon. Aqueous hydrochloric acid is added to the solution.

The silicon compound preparation comprising a sol gel is introduced in the porosity of a heat treated preform. Following drying, the preform is infiltrated with a solution of acetone and Titanocene dichloride. The amount of added titanocene dichloride corresponding to a molar ratio of titanium to silicon of 0.15. Following removal of the solvent, the preform containing silicon compounds and/or carbon particles is loaded in a CVI furnace and taken to 1500° C. (2732° F.) under flowing argon gas and/or nitrogen gas. During the initial part of the heat treatment the cellulose nanofibers are carbonized. Following a hold of four hours at 1500° C. (2732° F.) to form the silicon carbide whiskers through the carbo-thermal reduction of the silicon, the temperature of the furnace is lowered to a temperature compatible with CVI pyrolytic carbon (i.e., 900° C. (1652° F.) to 1100° C. (2012° F.)). The carbon structure is subsequently densified through multiple CVI pyrolytic carbon and heat treatment cycles. Heat treatments are conducted at temperature between 1100° C. (2012° F.) and 1600° C. (2912° F.), or between 1400° C. (2552° F.) and 1800° C. (3272° F.). The silicon carbide whisker content may be about 13% by weight the final carbon composite, wherein "about" as used in this context only means plus or minus 3% by weight. The silicon carbide whiskers may comprise about 10% by volume of the porosity of the preform, wherein "about" as used in this context only means plus or minus 3% by volume.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method of treating a carbon structure, comprising:
   applying a stoichiometric adjustment preparation comprising at least one of zirconium oxide or titanium oxide to the carbon structure;
   drying the carbon structure;
   infiltrating the carbon structure with a silicon compound preparation;
   heat treating the carbon structure to form a plurality of silicon carbide whiskers in the carbon structure, and to form a stoichiometric adjustment coating comprising at least one of zirconium carbide and titanium carbide; and
   densifying the carbon structure,
   wherein the silicon compound preparation comprises silicon nitride, wherein a stoichiometric weight ratio of carbon to silicon nitride within the silicon compound preparation is between 0.15 and 0.26.

2. The method of claim 1, wherein the silicon compound preparation further comprises at least one of silicon monoxide or silicon dioxide.

3. The method of claim 1, wherein the silicon compound preparation comprises at least one of a colloidal suspension or a sol gel.

4. The method of claim 1, further comprising partially densifying the carbon structure by chemical vapor infiltration (CVI) before the infiltrating the carbon structure with the silicon compound preparation.

5. The method of claim 1, further comprising partially densifying the carbon structure by CVI after the infiltrating the carbon structure with the silicon compound preparation, forming a partially densified carbon structure.

6. The method of claim 5, further comprising infiltrating the partially densified carbon structure with the silicon compound preparation.

7. The method of claim 1, further comprising applying a thin pyrolytic carbon layer to the carbon structure before the infiltrating the carbon structure with the silicon compound preparation.

8. The method of claim 1, wherein the silicon compound preparation comprises at least one of a nickel compound, an iron compound, a cobalt compound, and/or a titanium compound.

9. The method of claim 1, wherein the silicon compound preparation comprises a carbon source, the carbon source comprising at least one of carbon black, sucrose, dextrose, maltose, cellulose, polyvinyl butyral, polyethylene glycol, poly polyvinyl alcohol, polyacrylamide, polyvinylpyrrolidone, polyvinyl acetate, polyethyleneimine, polyvinyl butyral, polyacrylate, or a polyester, epoxy, or phenolic resin.

10. The method of claim 1, wherein, after the densifying, the plurality of silicon carbide whiskers comprise, by weight, 5% to 35% of the carbon structure.

11. The method of claim 1, wherein the heat treating the carbon structure to form the plurality of silicon carbide whiskers and the stoichiometric adjustment coating comprises a temperature ranging from 1400° C. to 1850° C.

12. A method of treating a carbon structure, comprising:
forming the carbon structure;
treating the carbon structure with heat at a first temperature ranging from 1000° C. to 2400° C.;
applying a stoichiometric adjustment preparation comprising at least one of zirconium oxide or titanium oxide to the carbon structure;
drying the carbon structure;
infiltrating the carbon structure with a silicon compound preparation comprising at least one of a colloidal suspension or a sol gel, the silicon compound preparation comprising at least one of silicon nitride, silicon monoxide, or silicon dioxide as a silicon source;
treating the carbon structure with heat at a second temperature ranging from 1400° C. to 1850° C. to form a plurality of silicon carbide whiskers, and to form a stoichiometric adjustment coating comprising at least one of zirconium carbide and titanium carbide; and
densifying the carbon structure,
wherein the silicon compound preparation comprises silicon nitride, wherein a stoichiometric weight ratio of carbon to silicon nitride within the silicon compound preparation is between 0.15 and 0.26.

13. The method of claim 12, further comprising partially densifying the carbon structure by CVI before the infiltrating the carbon structure with the silicon compound preparation.

14. The method of claim 12, further comprising partially densifying the carbon structure by CVI after the infiltrating the carbon structure with the silicon compound preparation, forming a partially densified carbon structure.

15. The method of claim 14, further comprising infiltrating the partially densified carbon structure with the silicon compound preparation.

16. The method of claim 12, wherein, after the densifying, the plurality of silicon carbide whiskers comprise, by weight, 5% to 35% of the carbon structure.

17. A method of treating a carbon structure, comprising:
forming the carbon structure;
treating the carbon structure with heat at a first temperature ranging from 1000° C. to 2400° C.;
applying a stoichiometric adjustment preparation comprising at least one of zirconium oxide or titanium oxide to the carbon structure;
drying the carbon structure;
infiltrating the carbon structure with a silicon compound preparation comprising at least one of a silicon colloidal suspension or a sol gel, the silicon compound preparation comprising silicon nitride, wherein a stoichiometric weight ratio of carbon to silicon nitride within the silicon compound preparation is between 0.15 and 0.26;
treating the carbon structure with heat at a second temperature ranging from 1400° C. to 1850° C. to form a plurality of silicon carbide whiskers within a plurality of pores in the carbon structure, and to form a stoichiometric adjustment coating comprising at least one of zirconium carbide or titanium carbide; and
densifying the carbon structure by chemical vapor infiltration (CVI).

18. The method of claim 17, wherein, after the densifying, the plurality of silicon carbide whiskers comprise, by weight, 5% to 35% of the carbon structure.

19. The method of claim 17, wherein the silicon compound preparation further comprises at least one of silicon monoxide or silicon dioxide.

* * * * *